United States Patent [19]
Amanuma et al.

[11] Patent Number: 5,621,174
[45] Date of Patent: Apr. 15, 1997

[54] VIBRATION DETECTION DEVICE

[75] Inventors: Tatsuo Amanuma, Ageo; Sueyuki Ohishi, Tokyo; Masato Matsuzawa, Kawasaki, all of Japan

[73] Assignee: Nikon Corporation, Tokyo, Japan

[21] Appl. No.: 377,804

[22] Filed: Jan. 24, 1995

[30] Foreign Application Priority Data

Apr. 28, 1994 [JP] Japan .................................. 6-092630

[51] Int. Cl.⁶ .......................... G01N 29/00; H04N 5/232; G03B 5/00; G01H 17/00
[52] U.S. Cl. .................. 73/661; 348/208; 396/52
[58] Field of Search ........................ 348/208, 326, 348/222; 354/403, 410, 430, 70; 250/201.4, 201.6; 73/654, 658, 661, 602, 1 DV

[56] References Cited

U.S. PATENT DOCUMENTS

| | | | |
|---|---|---|---|
| 5,099,694 | 3/1992 | Sumio et al. | 73/654 |
| 5,231,445 | 7/1993 | Onuki et al. | 354/410 |
| 5,282,044 | 1/1994 | Misawa et al. | 348/208 |
| 5,459,542 | 10/1995 | Fujiwara et al. | 354/202 |
| 5,469,210 | 11/1995 | Noguchi et al. | 348/208 |

*Primary Examiner*—Hezron E. Williams
*Assistant Examiner*—Rose M. Miller

[57] ABSTRACT

A vibration detection device includes a detecting device for detecting a vibration, and an output from the amplifying device obtained when outputting a detection signal on the basis of the detection result, an amplifying device for amplifying the detection signal, an initializing device for initializing the output from the amplifying device, and an adjusting device for adjusting the output from the amplifying device so that an output from the amplifying device obtained when the amplifying device is initialized, and an output from the amplifying device obtained when the amplifying device is not initialized and the detecting device generates no signal have substantially the same values.

6 Claims, 2 Drawing Sheets

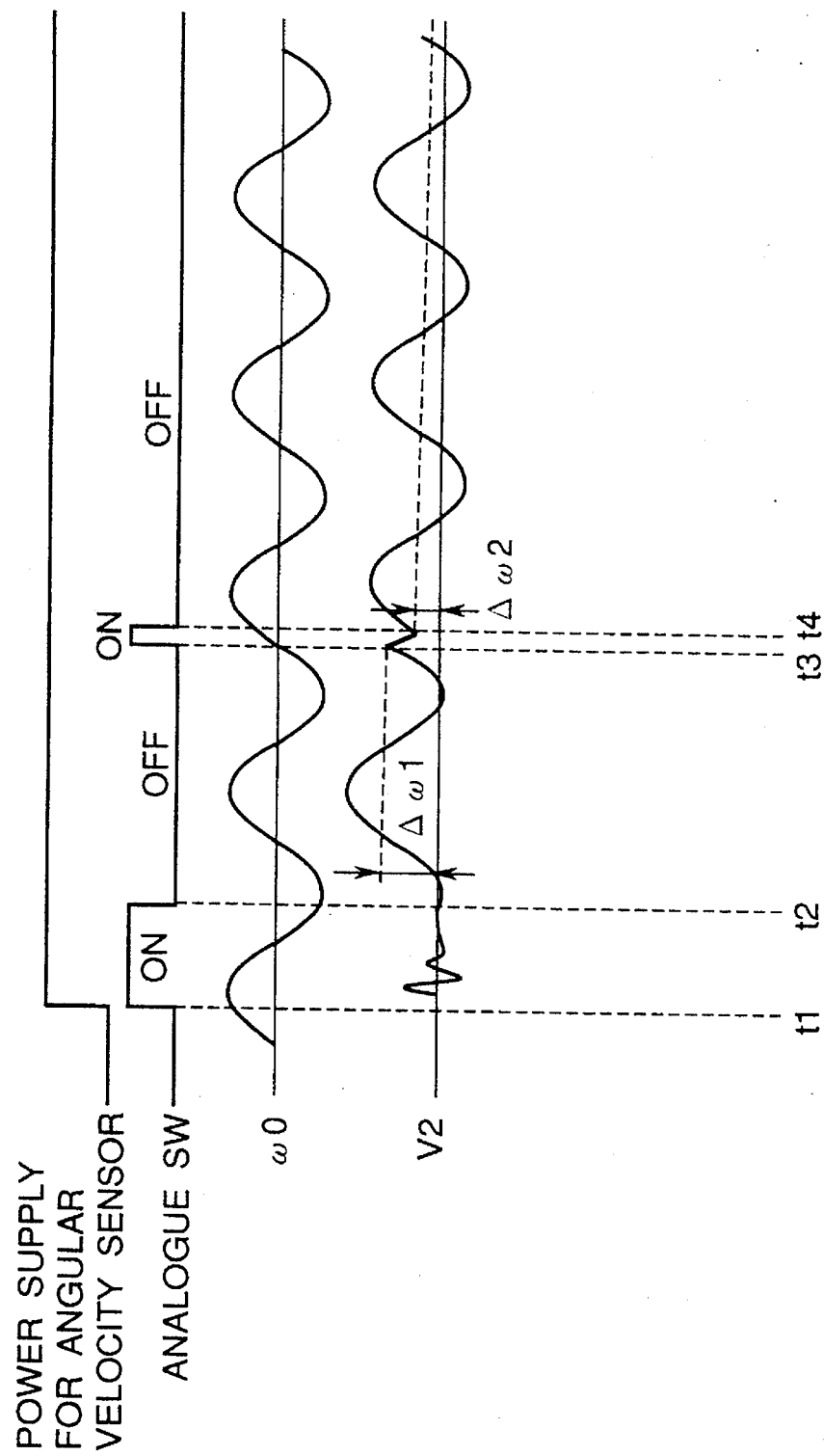

VIBRATION DETECTION DEVICE

BACKGROUND OF THE INVENTION

1. Field of the Invention

The present invention relates to a vibration detection device for detecting a vibration upon photographing in an image pickup apparatus such as a camera.

2. Related Background Art

FIG. 1 shows a conventional vibration detection device of this type.

An angular velocity sensor 1 detects an angular velocity due to a vibration. A low-pass filter 2 removes high-frequency components, which are not caused by a camera shake, from the output from the angular velocity sensor 1. An amplifier 3 constitutes, using a capacitor C and resistors R, a high-pass filter for removing low-frequency components which are not caused by a camera shake, and constitutes an amplifier for non-inverting amplifying a signal from the low-pass filter 2 using an operational amplifier (denoted by OP2 in FIG. 1). A known one-chip microcomputer unit (to be abbreviated as an MCU hereinafter) 5 has an A/D conversion input. A buffer circuit 4 includes a known reference voltage generator 6. The output from the reference voltage generator 6 is supplied to the amplifier 3 via the buffer circuit 4. A start switch SW1 is connected to the MCU 5, and when the switch SW1 is turned on, the MCU 5 begins to control a series of sequences for detecting a vibration. An analogue switch SW2 is turned on/off in accordance with an output from an output port of the MCU 5. When the switch SW2 is turned on/off, the initializing operation of the amplifier 3 is controlled. The reason why the initializing operation of the amplifier 3 is performed is as follows. More specifically, since the output from the sensor varies upon power ON, a final output (V2) of the circuit also largely varies, and this variation adversely influences vibration reduction. Therefore, the initializing operation of the amplifier 3 is performed to suppress the variation. Note that this variation occurs even when the sensor generates no output.

In the prior art, the above-mentioned arrangement calculates a position corresponding to angular velocity ="0" detected by the angular sensor 1. Thereafter, upon detection of angular velocity="0", the amplifier is initialized using the analogue switch SW2. Then, vibration reduction control is executed using the output signal from the amplifier.

Note that the vibration reduction control is performed as follows. More specifically, a driving system of a partial optical system (vibration reduction optical system) in a photographing optical system is driven on the basis of the output signal from the amplifier, thereby shifting the vibration reduction optical system in a direction perpendicular to the optical axis. With this operation, image blur reduction of an object image on a film surface in the photographing optical system as a whole is achieved. The image blur reduction is known to those who are skilled in the art.

However, in the prior art, even when the angular velocity signal as an output signal from the amplifier is determined to be "0" and the initializing processing of the amplifier is performed, an error voltage is generated in the output from the amplifier 3 under the influence of an offset voltage and an input offset current of an operational amplifier OP3 constituting the buffer circuit 4, and an input offset current of the operational amplifier OP2 constituting the amplifier 3, thus often disturbing accurate vibration reduction control.

SUMMARY OF THE INVENTION

It is, therefore, an object of the present invention to provide a vibration detection device, which can detect an amplified angular velocity signal which includes an error in a smaller amount than that in a conventional signal.

In order to achieve the above object, the vibration detection device of the present invention comprises a detecting device for detecting a vibration, and outputting a detection signal on the basis of the detection result, an amplifying device for amplifying the detection signal, an initializing device for initializing the output from the amplifying device, and an adjusting device for adjusting the output from the amplifying device so that an output from the amplifying device obtained when the amplifying device is initialized, and an output from the amplifying device obtained when the amplifying device is not initialized and the detecting device generates no signal have substantially the same values. By the adjustment of the adjusting device, an output error of the amplifying device is corrected and reduced, thus allowing accurate vibration detection.

A device according to another mode of the present invention comprises a detecting device for detecting a vibration and outputting a detection signal indicating an angular velocity on the basis of the detection result, an amplifying device for amplifying the detection signal and outputting an amplified signal, a reducing device for performing vibration reduction at least during exposure on the basis of the amplified signal amplified by the amplifying device, an initializing device for initializing the amplifying device when the detection signal indicates angular velocity ="0", and an adjusting device capable of adjusting an output from the amplifying device, so that an output from the amplifying device obtained when the amplifying device is initialized, and an output from the amplifying device obtained when the amplifying device is not initialized and the detecting device outputs no detection signal have substantially the same values. With this arrangement as well, an output error of the amplifying device can be corrected and reduced, thus allowing accurate vibration detection.

The adjusting device may adjust the output from the amplifying device by trimming a resistor, so that an output from the amplifying device obtained when the amplifying device is initialized, and an output from the amplifying device obtained when the amplifying device is not initialized and the detecting device outputs no detection signal have substantially the same values. In this case, the adjustment can be performed easily and quickly.

Alternatively, the adjusting device may adjust the output from the amplifying device by varying a resistor, so that an output from the amplifying device obtained when the amplifying device is initialized, and an output from the amplifying device obtained when the amplifying device is not initialized and the detecting device outputs no detection signal have substantially the same values. In this case as well, the adjustment can be performed easily and quickly.

BRIEF DESCRIPTION OF THE DRAWINGS

FIG. 3 is a chart showing the output waveform of an operational amplifier when the output waveform from an angular velocity sensor is a sinusoidal wave.

DETAILED DESCRIPTION OF THE PREFERRED EMBODIMENT

Figure 1:
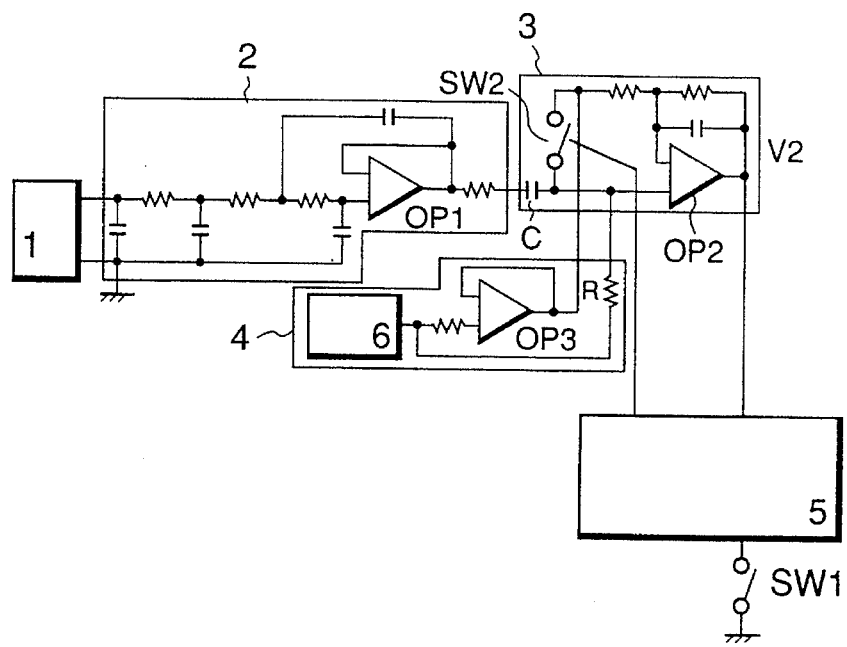
FIG. 1 is a circuit diagram of a conventional vibration detection circuit.
Figure 2:
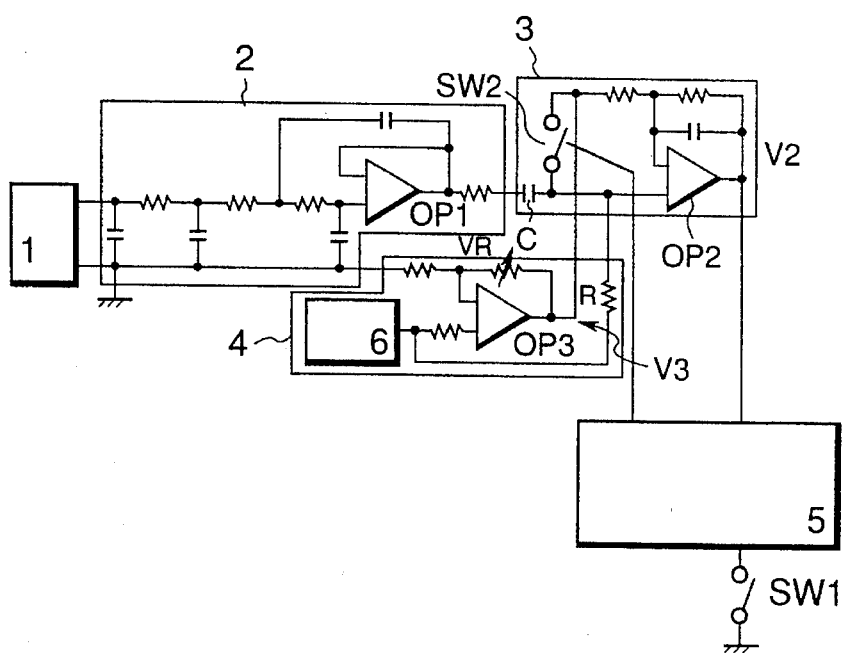
FIG. 2 is a circuit diagram of a vibration detection circuit according to an embodiment of the present invention.

FIG. 2 is a circuit diagram showing an embodiment of the present invention. The same reference numerals in FIG. 2 denote the same parts as in FIG. 1, and a detailed description thereof will be omitted.

The difference between the arrangement of this embodiment and that of the conventional circuit (i.e., the circuit shown in FIG. 1) lies in the following arrangement. That is, a variable resistor VR is connected between the inverting input terminal (−) and the output terminal of an operational amplifier OP3 used in a buffer circuit 4 for a reference voltage generator 6, so that an output voltage V3 from the operational amplifier OP3 can be adjusted. In the above-mentioned arrangement, by adjusting the value of the variable resistor VR, the output from an amplifier 3 can be adjusted, so that an output from the amplifier 3 obtained when the amplifier 3 is initialized and an output from the amplifier 3 obtained when the amplifier 3 is not initialized and an angular velocity sensor 1 generates no signal have substantially the same values. Since the variable resistor is used, the resistance can be adjusted quickly and easily.

Therefore, since input offset currents and input bias currents of operational amplifiers OP2 and OP3 and an input offset voltage of the operational amplifier OP3 can be canceled, error factors caused by a low-pass filter 2 and the amplifier 3 can be eliminated, and an accurate vibration output voltage can be input to an MCU 5.

In this embodiment, the input offset currents and input bias currents of the operational amplifiers OP2 and OP3 and the input offset voltage of the operational amplifier OP3 are canceled using the variable resistor VR. Alternatively, the resistance of this resistor may be adjusted by irradiating a laser beam (cutting of a resistor by laser trimming). In this case, a required resistance can be obtained easily and quickly.

FIG. 3 shows an output waveform V2 of the amplifier 3 obtained when the output waveform from the angular velocity sensor 1 is a sinusoidal wave. At time t1, electric power is supplied to the angular velocity sensor 1, and an analog switch SW2 is turned on to initialize the amplifier 3 upon power ON. At time t2, the analog switch SW2 is turned off, and a peak (maximum value) and a bottom (minimum value) of the output V2 are detected during an interval from time t2 to time t3. When the output V2 has reached an average value of these values (t3), it is determined that the angular velocity is "0", and the analog switch SW2 is turned on again (detection of angular velocity="0"). Thereafter, the analog switch SW2 is turned off immediately at time t4. After time t4, the output from the angular velocity sensor, i.e., a vibration state of a camera is detected.

In the conventional circuit arrangement, when the analog switch SW2 is turned off at time t4, a deviation amount $\Delta\omega 2$ from the reference voltage becomes large, and the accuracy of vibration reduction control deteriorates. As a result, a picture with a high resolution cannot be obtained.

In contrast to this, in the circuit arrangement according to this embodiment, since the resistance can be arbitrarily adjusted using a variable resistor or by laser trimming, the deviation amount $\Delta\omega 2$ from the reference voltage can be reduced, and as a result, an amplified angular velocity signal with a small error can be detected. Therefore, accurate vibration reduction control can be performed, and a picture with a high resolution can be obtained.

Note that the above embodiment has exemplified a circuit in which the deviation amount $\Delta\omega 2$ is generated in the output V2 upon the second OFF operation of the analog switch SW2 (i.e., time t4). However, a deviation may also be generated in the output V2 after the first OFF operation of the analog switch SW2 (i.e., time t2). According to the circuit arrangement of this embodiment, this deviation amount can also be reduced.

What is claimed is:

1. A vibration detection device comprising:
   a detecting device to detect a vibration and to output a detection signal on the basis of the detection result;
   an amplifying device to amplify the detection signal detected by said detecting device;
   an initializing device to initialize said amplifying device when said detection signal has a value indicating "0" as the detection result; and
   an adjusting device to adjust an output from said amplifying device, such that a first output from said amplifying device and a second output from said amplifying device have substantially the same value, said first amplifying device output being obtained when said amplifying device is initialized, and said second amplifying device output being obtained when said amplifying device is not initialized and said detecting device produces no signal.

2. A device according to claim 1, wherein said adjusting device can adjust the output from said amplifying device by trimming a resistor.

3. A device according to claim 1, wherein said adjusting device can adjust the output from said amplifying device by varying a resistor.

4. A vibration detection device comprising:
   a detecting device to detect a vibration and to output a detection signal indicating an angular velocity on the basis of the detection result;
   an amplifying device to amplify the detection signal and to output an amplified signal;
   a reducing device to perform vibration reduction at least during exposure on the basis of the amplified signal amplified by said amplifying device;
   an initializing device to initialize said amplifying device when the detection signal indicates an angular velocity="0"; and
   an adjusting device capable of adjusting an output from said amplifying device, such that a first output from said amplifying device and a second output from said amplifying device have substantially the same value, said first amplifying device output being obtained when said amplifying device is initialized, and said second amplifying device output being obtained when said amplifying device is not initialized and said detecting device produces no signal.

5. A device according to claim 4, wherein said adjusting device can adjust the output from said amplifying device by trimming a resistor.

6. A device according to claim 4, wherein said adjusting device can adjust the output from said amplifying device by varying a resistor.

\* \* \* \* \*